UNITED STATES PATENT OFFICE.

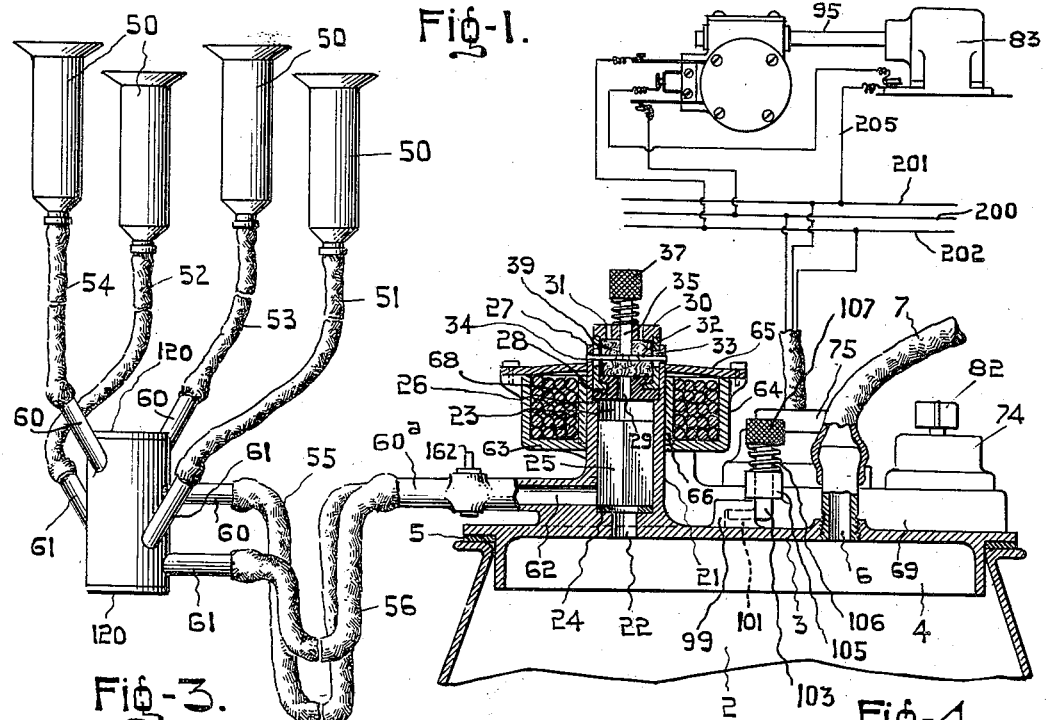
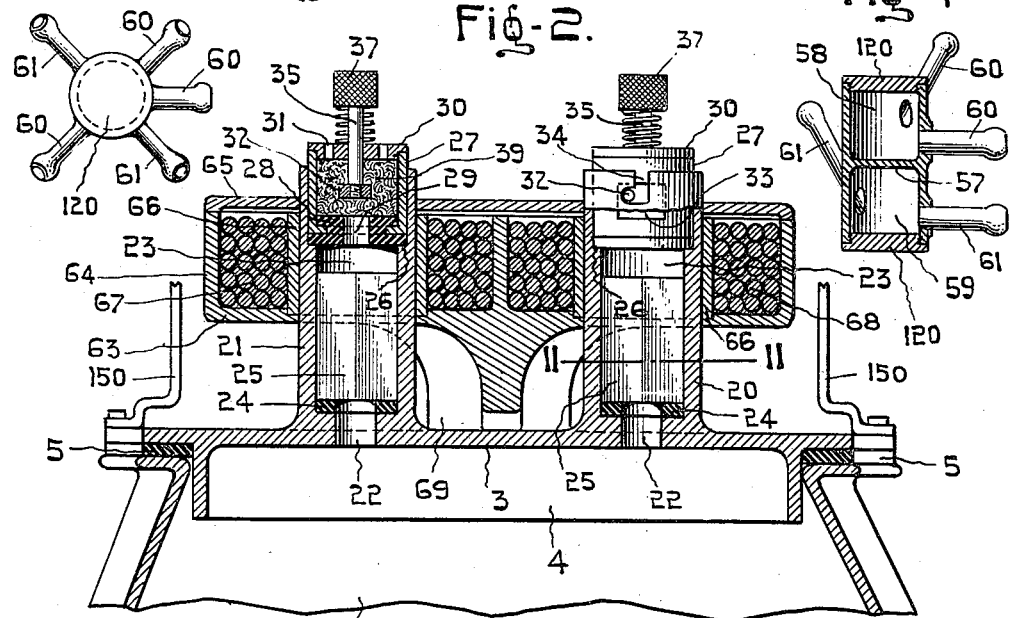
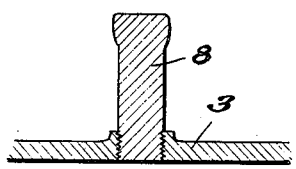

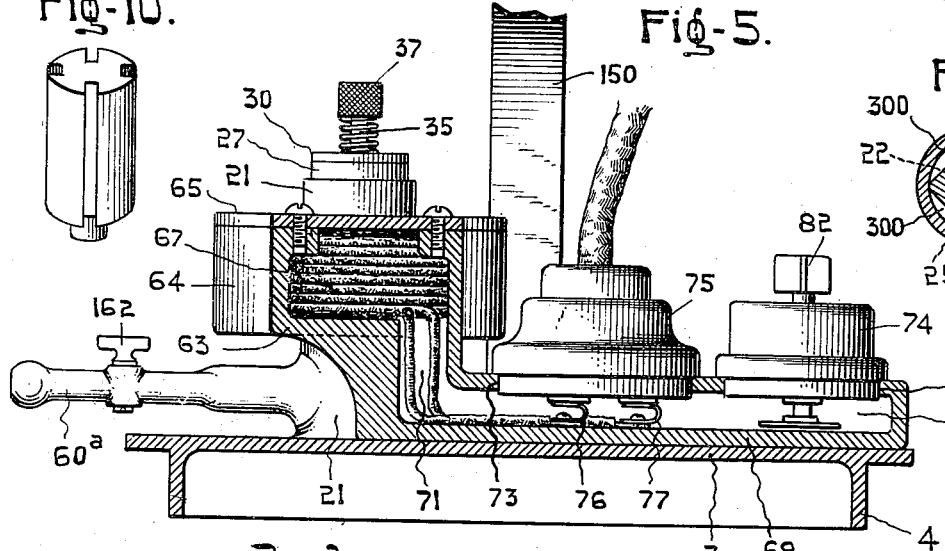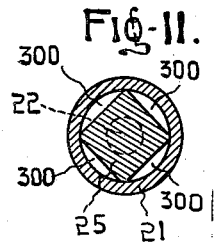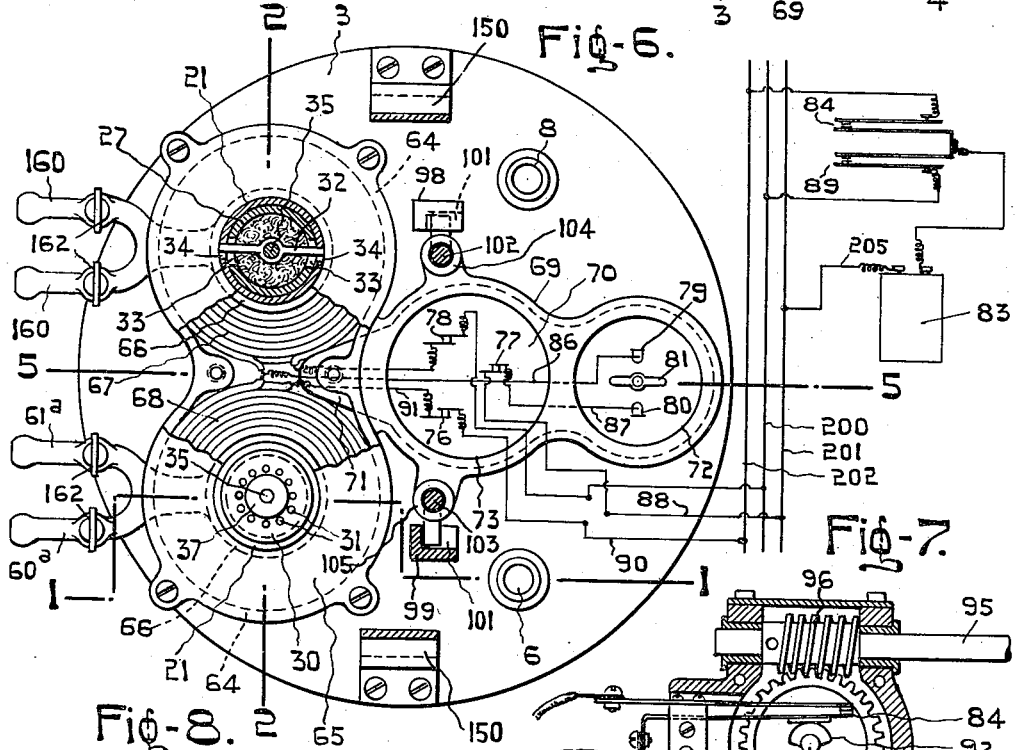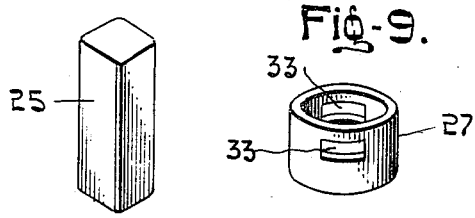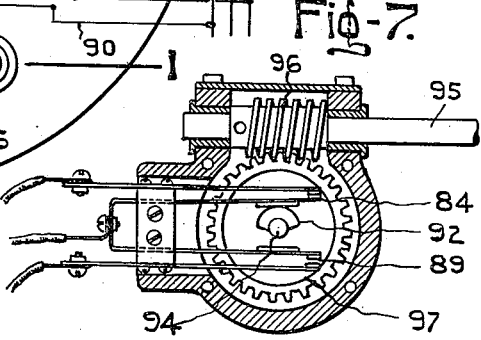

SEWARD ALGER WARNER, OF YPSILANTI, MICHIGAN.

MILKING MACHINE.

1,413,546.  Specification of Letters Patent.  Patented Apr. 18, 1922.

Application filed March 9, 1920. Serial No. 364,599.

*To all whom it may concern:*

Be it known that I, SEWARD ALGER WARNER, of the city of Ypsilanti, State of Michigan, U. S. A., a citizen of the United States, have invented certain new and useful Improvements in Milking Machines; and I do hereby declare that the following is a full, clear, and exact description thereof.

My invention relates particularly to pulsators for the electrically operated vacuum milking machine of the class in which the pulsator valve is actuated by magnetic force.

In the majority of milking machines of this class which have been put into practice it has been found that the machines quickly lost their efficiency owing to the parts, particularly in the pulsators, becoming worn and permitting air to leak into the pail, and effect the vacuum. Furthermore most of the parts constituting these machines have required such accurate machining and adjusting that the cost of the production has been relatively high and when the machine became "out of order" the services of a skilled mechanic had to be employed to put it in working order.

The object of my invention is to overcome these defects by providing a pulsator made up of more or less loosely fitting parts which may be assembled without fine adjustments. The parts being loosely fitting, accurate machining will not be required and wear will be reduced to a minimum. Further objects are to provide a construction which will permit of ready inspection and removal of the pulsator valve; and to provide a single or double water-proof magnetic unit which may be detachably mounted upon the top of the milk receptacle and be readily connected or disconnected to the source of the electrical energy. Briefly stated my invention consists of a vacuum milking machine comprising a milk receptacle having teat and suction connections thereto and comprising a valve case in communication with the interior of the milk receptacle at one end and with the atmosphere at the opposite end, an iron valve within said case and loosely movable therein, a magnetic coil encircling the case and adapted to actuate the valve whereby the latter in one position closes the atmospheric intake to the teat connection and opens communication between the latter and the interior of the milk receptacle.

For full comprehension, however, of my invention, reference must be had to the accompanying drawings in which similar reference characters indicate the same parts, and wherein:

Figure 1 is a vertical sectional view taken on line 1—1 Figure 6 of a milking machine constructed according to my invention;

Figure 2 is a vertical sectional view taken on line 2—2 Figure 6;

Figure 3 is a detail plan of the "claw" connection between the branch milk tubes and main tubes;

Figure 4 is a vertical sectional view of the "claw";

Figure 5 is a vertical sectional view taken on line 5—5 Figure 6;

Figure 6 is a plan view of my improved milking unit;

Figure 7 is a detail view of the "make and break" device;

Figure 8 is a detail elevation of one of the pulsator valve members;

Figure 9 is a detail view of the removable closure and air filtering device for the upper end of the pulsator valve case;

Figure 10 is a modification of the pulsator valve member and

Figure 11 is a transverse sectional view of one of the pulsator valves taken on line 11—11, Figure 2.

Fig. 12 is a detail view of a holding plug.

The preferred embodiment of my invention is the milking machine illustrated in the accompanying drawings.

The milk receptacle is indicated at 2 and is closed by a flat cover 3 having a depending circumferential flange 4 adapted to fit inside the receptacle, an annular gasket 5 located between the receptacle and cover making the joint air-tight. The receptacle is adapted to be connected to the suction pipe line (not shown) through a nipple 6 formed integrally with the cover over which one end of the flexible tube 7 is adapted to be fitted. The opposite end of the tube when idle may be fitted over a plug 8 of corresponding dimensions to the nipple and mounted upon the cover adjacent the same.

The pulsator mechanism consists of a pair of vertical disposed cylindrical valve cases 20 and 21 projecting upwardly from the cover and formed integrally therewith. The valve cases are spaced a distance apart and are alike in all respects each having at its lower end a suction port 22 effecting communication between the valve chamber 23 and the interior of the receptacle, an annular packing member 24 being seated upon such lower end of the valve chamber and constituting a seat for the pulsator valve 25. The upper end of the valve chamber is closed by a combined closure and filtering device detachably secured thereto, the valve chamber being of increased diameter to present a shoulder 26 upon which the closure is seated. This combined closure and filtering device consists of a cup-like member 27 the bottom of which is constituted by a packing member 28 having an air inlet port 29 centrally thereof, such packing member constituting a valve seat for the upper end of the valve 25. The top of this cup-like member is closed by a cover 30 having a circumferential series of air inlet ports 31 therein. This cover is held in place and the complete closure is detachably secured to the upper end of the valve case by a transverse bar 32 contained within the cup and extending laterally through diametrically oppositely positioned openings 33 in the surrounding wall thereof, the extreme ends of the bar engaging in bayonet slots 34 in the adjacent portions of the valve case. To the middle of this bar is connected the lower end of a short bolt 35 passing upwardly through a central opening in the cover and which is provided with a knurled finger-hold 37, a spring bearing between the top of the cover and such finger-hold yieldingly maintaining the cover upon the top of the cup, and the closure upon its seat 26. To filter the air entering the ports 31 the interior of the cup is filled with cotton-batting or like material indicated at 39. The closure may be removed by giving the finger-hold 37 a slight turn to the left thus freeing the extreme ends of the transverse bar 32 from the bayonet slots. The cover 30 may be removed from the cup by moving the latter with its retaining means to one side of the cup until the opposite end of the bar clears the adjacent portion of the valve case in which position it may be easily withdrawn. This construction and arrangement of parts permits of the ready inspection of the valve and also of easy assembly by the most inexperienced of operators.

Each valve 25 is loosely movable within its valve case and is capable of up and down movement therein under the influence of electromagnetic means encircling the case. In the embodiment illustrated each valve consists of a unitary iron member of rectangular cross-section of uniform dimensions throughout and its opposite ends are flat the lower end being adapted to close the suction port 22 when the valve is in its lowermost position while the upper end is adapted to close the air intake port when the valve is in its uppermost position.

The rectangular cross-section of the valve presents longitudinal air passages 300 between the perimeter of the valve and the valve case which passages are adapted to effect communication between the air inlet port and milk tubes when the valve is in position closing the port 22. Although a valve of rectangular cross-section is illustrated and described herein it is to be distinctly understood that I do not limit myself to such a construction, a loosely fitting valve of circular cross-section with passages effecting communication between the teat connections and the atmosphere may be employed without departing from the spirit of my invention as illustrated in Figure 10.

The milk is conducted from the udder to the pulsator mechanism through teat cups 50, branch milk tubes 51, 52, 53 and 54, main milk conducting tubes 55 and 56 and a "claw" connection effecting communication between the branch tubes and the main tubes. This "claw" consists of a hollow member divided by a transverse partition 57 into upper and lower chambers 58 and 59, the upper chamber having branch nipples 60 over which are respectively fitted the adjacent ends of the branch tubes 53 and 54 and the main tube 55 and the lower chamber having similar nipples 61 over which the ends of the tubes 51 and 52 and 56 are fitted. The purpose of this construction and arrangement of parts is to connect each of the main tubes to two of the branch tubes in order that suction will be exerted upon two of the teats when the other two are relieved, consequently the danger of the teat cups dropping off will be largely overcome. Removable plugs 120 are screwed into the upper and lower ends of the "claw" and permit of the compartments within the latter being cleaned.

The main milk conducting tubes 55 and 56 communicate with their respective valve chambers adjacent to the lower ends thereof, through branch nipples 60ª and 61 each containing a passage 62. The valves 25 are adapted to be alternately actuated by an electromagnetic unit adapted to be detachably mounted upon the cover of the milk receptacle in position encircling the valve cases. This unit consists of a casing constituted by a bottom 63 surrounding side wall 64 and cover 65 the bottom and cover having openings in vertical alignment with each other to permit the casing to be fitted over the valve cases and a circular wall 66 surrounding each opening and extending from the bottom to the cover. Within the annular chambers contained in this casing are located a pair of magnetic coils 67 and 68 each encircling the upper end of one of the valves. This position of the coil is obtained by a lateral extension 69 formed integrally with the casing and having an upwardly turned end upon which the casing is supported the bottom of the extension being flat and adapted to lie flush upon the cover. This extension contains a chamber 70 extending throughout the length thereof and communicating with the interior of the casing between the coils through a passage 71, circular openings 72 and 73 being provided in the top of the extension to constitute sockets for a switch 74 and detachable plugs 75 respectively, the plug having three contacts, 76, 77 and 78, and the switch two contacts 79 and 80 adapted to be closed by an intermediate member 81 operated by a button 82.

The power may be derived from any suitable source. In the embodiment illustrated it is obtained from a generator 83 and adapted to be conducted intermittently to each of the coils through a "make and break" device which alternately connects the circuits of the coils with the generator, through permanent lines with which the pulsator units can be connected by portable conductors at convenient points. The connection of coil 67 to the permanent lines is effected by a portable lead extending from the permanent line 200 to contact 78 of the plug 75 and this contact is electrically connected to one end of the coil 67. The circuit is completed through a lead 86 common to both coils and connected to the contact 79 of the switch, the other contact of which is connected to contact 77 of the plug as at 87 and from the contact 77 to the permanent line 201 by a portable lead 88. The circuit in which the coil 68 is incorporated is identical with that of the coil 67 and includes the pairs of contacts 84 and 89 of the "make and break" device are connected respectively to permanent lines 200 and 202 the line 201 being connected to the generator as at 205. A lead 90 extending from the permanent line 202 to contact 76 of the plug 75 and from thence to one end of 91 of the coil 68 from the coil through lead 86 to contact 79 of the switch and from the switch to the permanent line 201 through lead 87, contact 77 and portable lead 88. Each of the pairs of contacts 84 and 89 of the make and break device is adapted to be normally sprung apart and the pairs are alternately closed by a cam 92 located intermediate of the pairs and mounted upon a stub shaft 94 journalled in a housing and being driven from the generator shaft 95 through a worm 96 and worm wheel 97 or any other desired means. One of each of the pairs of contacts is constantly in communication with the generator incorporated in the generator circuit.

The electromagnetic unit is adapted to be detachably connected to the cover of the milk receptacle through lugs 98 and 99 formed integrally therewith and having sockets 101 with which engage detachably hook fasteners 102 and 103 mounted in lugs 104 and 105 on the extension 69 on opposite sides of the plug 75 the toe of each fastener being adapted to be moved into the socket of its respective lug and relative displacement being yieldingly resisted by a helical spring 106 encircling the shank of the hook and bearing between each lug, 104 and a finger-hold 107.

The usual bail is indicated at 150.

The embodiment of my invention as described and illustrated is particularly adapted for one cow (single unit) although additional milk conducting tubes may be connected to the nipples 160 if desired, the nipples, when not in use being closed by valves 162. It is to be distinctly understood, however, that a multiple unit machine may be equally well employed by multiplication of the parts without departing from the spirit of my invention.

*Operation.*

Preliminary to the operation of my improved machine the generator and vacuum pump are set in operation and the milking unit is connected to the suction pipe line and to the source of power. The switch is then closed and teat cups applied to the cow. The "make and break" device causes the coils to be alternately and intermittently magnetized. As each coil is magnetized the other is demagnetized and a flow of milk is obtained intermittently through each of the conducting tubes. As each coil is magnetized its valve which is located upon the valve seat at the lower end of its valve case closing port 22 is raised to position closing the air inlet port 29 and opening communication between the interior of the milk receptacle and the milk tube leading to the valve case in question. The partial vacuum within the receptacle which is obtained by a reduced pressure of approximately seven and one half (7½) pounds causes suction upon the teats to which the tube is connected thereby causing a flow of milk to the receptacle. This flow ceases when the coil is demagnetized as the valve drops back to position closing port 22 and opening inlet 29.

I claim—

1. In a vacuum milking machine the combination with a milk receptacle, means adapted to maintain a partial vacuum therein, and a teat connection, of an electromagnetic pulsator for alternately effecting communication between said teat connection and the interior of the milk receptacle and between the teat connection and the atmosphere said pulsator consisting of a valve case containing a valve chamber having closed ends, one of such ends having an air intake port therein, and the other end having a suction port therein effecting communication between the valve chamber and the interior of the milk receptacle, the center line of each of said ports coinciding with the longitudinal axial plane of the valve-case, a valve located in said chamber one end of said valve being adapted to close the air intake port when abutting against the end of the valve case containing the same and the opposite end of the valve being adapted to close the suction port when abutting against the end of the valve case containing the same electromagnetic means encircling the valve case and constructed and arranged to actuate the said valve.

2. In a vacuum milking machine, the combination with a milk receptacle, means adapted to maintain a partial vacuum therein, and a teat connection; of a pulsator for alternately effecting communication between the teat connection and the milk receptacle, and between the teat connection and the atmosphere, said pulsator consisting of a valve case having closed ends one of said ends having an air intake port therein and the other having a port effecting communication between the valve case and the milk receptacle, a valve longitudinally movable within said valve case, the ends of said valve presenting valvular faces adapted to control said ports, the center-line of each of said ports coinciding with the axial plane of the valve and an annular packing member located within the valve case at each end thereof and adapted to constitute a cushion valve seat for said valve, and means for actuating the valve.

3. In a vacuum milking machine the combination with a milk receptacle including the cover thereof, a suction connection to the milk receptacle and a teat connection of a pulsator adapted to connect the teat connection to the milk receptacle, said pulsator consisting of a valve case formed integrally with the cover and having an air intake port in its upper end and a port in its lower end communicating with the milk receptacle, an iron valve longitudinally movable within said case, said valve presenting a space throughout its length between it and the valve case constituting an air passage, a magnetic coil encircling the same with the valve within its magnetic field, said coil being adapted, when magnetized, to exert a lifting force on the valve for the purpose of closing the air intake port and opening the port at the lower end of the valve case and when demagnetized to release the valve for the purpose of closing the port in the lower end of the valve case and opening the air intake port and means for intermittently energizing said coil.

4. In a vacuum milking machine the combination with a milk receptacle including the cover thereof, a suction connection to said receptacle, a teat connection, of a pulsator for alternately effecting communication between the teat connection, and the milk receptacle and between the teat connection and the atmosphere, said pulsator consisting of a valve case supported upon the cover and having an air intake port in one end and a suction port in the other end in communication with the milk receptacle, said teat connection communicating with the interior of the valve case adjacent such last mentioned end, a relatively soft annular packing at each end of said valve case constituting a cushion valve seat, a valve within said valve case and of uniform dimensions throughout and adapted to control said ports, a magnetic coil carried independently of the valve case and encircling the same with the valve within its magnetic field and means for intermittently energizing said coil.

5. In a vacuum milking machine the combination with a milk receptacle including the cover thereof, of a suction connection to said receptacle and a milk conducting tube, of a pulsator alternately effecting communication between said milk conducting tube and the receptacle and between the tube and the atmosphere, said pulsator consisting of a valve case supported upon the cover and formed integrally therewith, a port in the lower end of said valve case communicating with the receptacle a valve within said valve case, an air filtering device mounted upon the upper end of said valve case and detachably secured thereto and adapted to permit of the withdrawal of the valve when detached, and an electromagnetic coil encircling the valve case and mounted in position independently of the latter and of the closure and adapted to actuate said valve.

6. In a vacuum milking machine the combination with a milk receptacle including the cover thereof, a suction connection to said receptacle, and a milk conducting tube, of a pulsator alternately effecting communication between said milk conducting tube and the receptacle and between the tube and the atmosphere, said pulsator consisting of a valve case supported upon the cover and a port in the lower end of said valve case communicating with the receptacle, a valve within said valve case, a combined closure and air filter device for closing the upper end of the valve case, said device consisting of a cup-like member the bottom of which having a port therein, a cover for said cup-like member having a plurality of air ports therein, and a textile filler within said cup-like member, said milk conducting tube communicating with the valve case at a point adjacent the lower end thereof and an electromagnetic coil encircling the valve case and mounted in position independently of the latter and of said closure and adapted to actuate said valve.

7. In a vacuum milking machine, the combination with a milk receptacle and a cover therefor; of a valve case formed integrally with the cover, a valve within said valve case, and an electromagnetic unit encircling said valve case and adapted to exert lifting force upon the valve and means for detachably fastening the unit to the cover and independently of the valve case.

8. In a vacuum milking machine, the combination with a milk receptacle and a cover therefor; of a valve case supported upon said cover, a valve within said valve case, and an electromagnetic unit encircling said valve case and adapted to exert lifting force upon the valve and means for detachably fastening the unit to the cover, said means consisting of lugs upon the cover and hook fasteners carried by said unit and adapted to engage said lugs.

9. In a vacuum milking machine the combination with a milk receptacle and a cover therefor; of a valve case formed integrally with the cover and having an open end, removable means for closing said end, a valve within said valve case, and a detachable electromagnetic unit in position encircling the valve case and adapted to exert a lifting force upon the valve said unit being detachable independently of said means for closing the valve case end.

10. In a vacuum milking machine a plurality of main milk conducting tubes, means for causing suction alternately through said main tubes, a plurality of branch milk conducting tubes and unitary means connecting some of the branch tubes to each of the main tubes, said unitary means consisting of a hollow member divided by a partition disposed transversely to its length into independent compartments, each compartment being in communication with one of said main tubes and some of the branch tubes.

11. In a vacuum milking machine, the combination with a milk receptacle, milk conducting tubes, pulsator mechanism controlling the flow of milk through said tubes and including a pair of electromagnetic coils, a valvular member located in the magnetic field of each coil, a pair of electric circuits, each circuit including one of said coils, a generator and a make and break device constructed and arranged to alternately and intermittently connect the circuits to the generator, for the purpose of causing the valvular members to pulsate, said make and break device consisting of a plurality of pairs of contacts, each pair being normally sprung apart, and a rotary device adapted to successively close said pairs of contacts and means for rotating said device.

12. In a vacuum milking machine, the combination with a milk receptacle, milk conducting tubes, pulsator mechanism controlling the flow of milk through said tubes and including a pair of electromagnetic coils, a valvular member located in the magnetic field of each coil, a pair of electric circuits, each circuit including one of said coils, a generator, and a make and break device constructed and arranged to alternately and intermittently connect the circuits to the generator, for the purpose of causing the valvular members to pulsate, said make and break device consisting of a plurality of pairs of contacts each pair being normally sprung apart, a rotary cam adapted to successively close said pairs of contacts, and means for rotating said cam, said means consisting of a shaft operatively connected to said generator, a worm upon said shaft, a worm-wheel in intermeshing relation with said worm and rotatable in unison with said cam.

13. In a vacuum milking machine, the combination with a milk receptacle a suction connection to said receptacle and a milk tube; of valvular means constructed and arranged to effect and control communication between the milk tube and milk receptacle, said valvular mechanism including a valve case mounted upon the receptacle and having a port in one end effecting communication with the interior of the receptacle and an air inlet port in its opposite end, said milk tube communicating with the valve case between the ends thereof and a valve within said valve case and adapted to control the said ports, said valve being constructed and arranged to present a longitudinal air passage between its perimeter and the valve case whereby communication between the air inlet port and milk conducting tube is effected when the valve is in position closing the port communicating with the milk receptacle.

14. In a vacuum milking machine, the combination with a milk receptacle, of a hollow nipple mounted upon the milk receptacle and communicating with the interior thereof, a flexible suction tube having one end fitted over said nipple and a plug of corresponding dimensions to said nipple and mounted upon said receptacle, the free end of the tube being adapted to be fitted over the plug when idle.

15. In a vacuum milking machine, the combination with a milk receptacle having a cover, milk conducting tubes leading to the receptacle, a suction connection to said receptacle; of a pulsator mechanism for controlling communication between the tubes and the receptacle, said mechanism including a plurality of valve cases supported upon the cover, and having open upper ends, detachable means closing said ends, valves within said valve cases, a portable electromagnetic unit independent of said detachable means and constructed and arranged to encircle the valve cases and consisting of a plurality of coils adapted to exert magnetic force upon the said valves and means for detachably fastening the unit to said cover.

16. In a vacuum milking machine the combination with a milk receptacle having a cover, milk conducting tubes leading to the receptacle, a suction connection to said receptacle and an electric power line; of a pulsator mechanism for controlling communication between the tubes and the receptacle, said mechanism including a plurality of valve cases supported upon the cover, valves within said valve cases, a portable electromagnetic unit constructed and arranged to encircle the valve cases and adapted to exert magnetic force upon the said valves, said unit consisting of a casing having an extension, a plurality of coils within said casing and means carried by said extension whereby the coils are connected to said electric power line and means for detachably fastening the unit to said cover.

17. In a vacuum milking machine the combination with a milk receptacle having a cover, milk conducting tubes leading to the receptacle, a suction connection to said receptacle and an electric power line; of pulsator mechanism for controlling communication between the tubes and the receptacle, said mechanism including a plurality of valve cases supported upon the cover, valves within said valve cases, a portable electromagnetic unit constructed and arranged to encircle the valve cases and adapted to exert magnetic force upon said valve cases, means for detachably fastening the unit to said cover, and means adapted to rest upon the cover for determining the position of the unit relatively to the valves for the purpose of obviating the necessity of fine adjustment.

18. In a vacuum milking machine, the combination with a milk receptacle, means adapted to maintain a partial vacuum therein, and a teat connection; of an electro-magnetic pulsator for alternately effecting communication between said teat connection and the atmosphere, said pulsator including a valve, a magnetic element adapted to exercise a magnetic influence upon said valve, and means intermittently magnetizing said element for the purpose of causing the valve to pulsate.

19. In a vacuum milking machine the combination with a milk receptacle, means adapted to maintain a partial vacuum therein, and a teat connection; of an electro-magnetic pulsator for alternately effecting communication between said teat connection and the interior of the milk receptacle and between the teat connection and the atmosphere, said pulsator consisting of a valve case containing a valve chamber having closed ends, one of such ends having an air intake port therein, and the other end having a suction port therein effecting communication between the valve chamber and the interior of the milk receptacle, the center-line of said ports coinciding with the longitudinal axial plane of the valve case, a valve located in said chamber one end of said valve being adapted to close the air intake port when abutting against the end of the valve case containing the same and the opposite end of the valve being adapted to close the suction port when abutting against the end of the valve case containing the same, electro-magnetic means consisting of a magnetic element adapted to exercise magnetic influence upon said valve and means for intermittently magnetizing said element whereby the valve is intermittently actuated.

20. In a vacuum milking machine, the combination with a milk receptacle, means adapted to maintain a partial vacuum therein, and a teat connection; of a pulsator for alternately effecting communication between the teat connection and the milk receptacle, and between the teat connection and the atmosphere, said pulsator consisting of a valve case having closed ends one of said ends having an air intake port therein and the other having a port effecting communication between the valve case and the milk receptacle, a valve longitudinally movable within said valve case, the ends of said valve presenting valvular faces adapted to control said ports, the center-line of each of said ports coinciding with the axial plane of the valve and an annular packing member located within the valve case at each end thereof and adapted to constitute a cushion valve seat for said valve, electro-magnetic means consisting of a magnetic element adapted to exert a magnetic influence upon said valve, and means for intermittently magnetizing said element whereby the valve is caused to pulsate.

21. In a vacuum milking machine, the combination with a milk receptacle, means for maintaining a partial vacuum therein, and a milk conducting tube; of a pulsator alternately effecting communication between said milk conducting tube and the receptacle and between the tube and the atmosphere, said pulsator consisting of a valve case supported on the milk receptacle, and having diametrically oppositely positioned bayonet slots in its upper end, a port in the lower end of said valve case communicating with the receptacle, a valve within said valve case, a combined closure and air filtering device for closing the upper end of the valve case, said device consisting of a cup-like member snugly fitted within the upper end of the valve case and having an air intake port in its bottom, the cover for said cup-like member having a plurality of air ports therein, a textile filler within said cup-like member, and means detachably fastening the combined closure and filter device in position in the upper end of the valve case, said means consisting of a transverse bar located within the cup-like member and extending diametrically across the same, the ends of said bar projecting outwardly from said member and adapted to engage bayonet slots in the upper end of the valve case and manually operated resilient means for moving the bar in and out of fastening engagement with the valve case.

22. In a vacuum milking machine, the combination with a milk receptacle having a cover, milk conducting tubes leading to the receptacle, and a suction connection to such receptacle; of a pulsator mechanism for controlling communication between the tubes and the receptacle, said mechanism including a plurality of valve cases supported upon the cover, valves within said valve cases, a portable electro-magnetic unit constructed and arranged to be fitted over the valve cases and consisting of a plurality of coils adapted to exert magnetic force upon the said valves, and means for alternately energizing the coils for the purpose of causing the valves to pulsate.

23. In a vacuum milking machine the combination with a milk receptacle and a cover therefor; of a valve case formed integrally within the cover, a valve within said valve case and an electromagnetic unit encircling said valve case and adapted to exert lifting force upon the valve, means for intermittently energizing said unit, and means for detachably fastening the unit to the cover and independently of the valve case.

24. In a vacuum milking machine a pair of main milk conducting tubes two pairs of branch milk conducting tubes having teat cups at their upper ends and a device connecting one of the main tubes to one pair of the branch tubes and the other main tube to the other pair of branch tubes, the lower ends of the branch tubes of each pair being connected to the device in a plane bisecting the centre of gravity thereof and the said planes being perpendicular to each other, and means for alternately causing suction through the pairs of branch tubes.

25. In a vacuum milking machine the combination with a milk receptacle having a cover, milk conducting tubes leading to the receptacle, a suction connection to said receptacle; of a pulsator mechanism for controlling communication between the tubes and the receptacle, said mechanism including a plurality of valve cases supported upon the cover, valves within said valve cases, a portable electromagnetic unit constructed and arranged to encircle the valve cases and consisting of a plurality of coils adapted to exert magnetic force upon said valves.

In testimony whereof I have signed my name to this specification in the presence of two witnesses.

SEWARD ALGER WARNER.

Witnesses:
GORDON G. COOKE,
WILLIAM J. C. HEWETSON.